United States Patent [19]

Chandler

[11] 4,250,064

[45] * Feb. 10, 1981

[54] PLASTIC FORMULATION REINFORCED WITH ORGANIC FIBERS

[75] Inventor: Herman Chandler, Newburgh, N.Y.

[73] Assignee: GAF Corporation, New York, N.Y.

[*] Notice: The portion of the term of this patent subsequent to Nov. 9, 1993, has been disclaimed.

[21] Appl. No.: 912,498

[22] Filed: Jun. 5, 1978

Related U.S. Application Data

[63] Continuation-in-part of Ser. No. 739,075, Nov. 5, 1976, abandoned, which is a continuation-in-part of Ser. No. 537,788, Dec. 31, 1974, Pat. No. 3,991,006.

[51] Int. Cl.$^3$ .......................... C08K 3/26; C08L 1/00
[52] U.S. Cl. .......................... 260/17.4 CL; 260/27 R; 260/30.6 R; 260/31.6; 260/31.8 R; 260/31.8 XA; 260/31.8 HR; 260/31.8 PQ; 260/33.6 UA; 260/33.8 UA; 260/40 R; 260/42.43; 260/42.46; 260/42.47; 260/42.49; 260/998.15
[58] Field of Search ............. 260/40 R, 998.15, 42.43, 260/42.46, 42.47, 42.49, 17.4 CL, 27 R, 30.6 R, 31.6, 31.8 R, 31.8 XA, 31.8 HR, 31.8 PQ, 33.6 UA, 33.8 UA

[56] References Cited

U.S. PATENT DOCUMENTS

| | | | |
|---|---|---|---|
| 3,336,254 | 8/1967 | White | 260/42.21 |
| 3,904,579 | 9/1975 | Braddicks | 260/42.49 |
| 3,931,094 | 1/1976 | Segal et al. | 260/42.18 |
| 3,991,006 | 11/1976 | Chandler | 260/40 R |

*Primary Examiner*—James H. Derrington
*Attorney, Agent, or Firm*—Joshua J. Ward; Walter C. Kehm

[57] ABSTRACT

A plastic formulation is disclosed suitable for the manufacture of tile and the like. The formulation comprises an intimate mixture of a plasticized resin and a low density organic fibrous filler. The plastic formulation also comprises, in uniform dispersion, from 20 percent to 50 percent by weight of a particulate filler such as calcium carbonate, having a particle size of no more than 20 microns and from 20 to 60 percent by weight of particulate filler of a particle size between about 20 and about 200 mesh. This combination of coarse and fine particulate filler facilitates the uniform dispersion of the organic, fibrous filler.

49 Claims, No Drawings

PLASTIC FORMULATION REINFORCED WITH ORGANIC FIBERS

CROSS REFERENCE TO RELATED APPLICATION

This application is a continuation-in-part of my co-pending application Ser. No. 739,075 filed Nov. 5, 1976, now abandoned, for Plastic Formulation Reinforced with Organic fibers, which in turn was a continuation-in-part of application Ser. No. 537,788 filed Dec. 31, 1974 for Plastic Molding Formulation Reinforced with Organic Fibers, now U.S. Pat. No. 3,991,006.

BACKGROUND OF THE INVENTION

Fiber-filled plastic compositions are widely used for making floor and wall tile, as well as for many other uses where the toughness which is imparted by fiber reinforcement is desired. In flexible, fiber reinforced plastic compositions, asbestos fibers have been commonly used, and continue to be used because of their many advantages, despite the major disadvantage that asbestos fibers are carcinogenic. Thus, the manufacture of plastic formulations containing asbestos presents difficult safety problems for the manufacturer.

Accordingly, it would be desirable to substitute the asbestos fibers in flexible plastic tile formulations and the like with another fiber, for example, natural or synthetic organic fibers such as polyester (Dacron) fibers, cellulosic fibers etc. Organic fibers are frequently preferred to inorganic fibers because their molecular chains can be broken or modified much more easily than the chains of inorganic fibers such as glass. Also, most organic fibers are of relatively low density as compared with inorganic fibers and accordingly offer significant savings in weight. However, the use of low density organic fibers on a commercial basis in plastic formulations has proven to be difficult, because the fibers have hitherto not dispersed easily throughout the plastic formulations during mixing. Accordingly, the finished products do not exhibit the desirable physical characteristics that one might expect from a fiber-reinforced plastic formulation. For example, the prior art finished products tend to exhibit insufficient tack, and thus do not adhere well to rollers for processing into sheet form.

In British Pat. No. 1,331,788, it is proposed to mix organic fibers into a plastic formulation for tile or the like, along with ground limestone particles (calcium carbonate) which generally range in particle size between 20 mesh and 200 mesh, to improve the structural properties of the tile such as abrasion resistance and hardness. However, the dispersion problem of organic fibers remains when ground limestone of this particle size is used, even when minor fractions of the limestone filler are smaller than 200 mesh. U.S. Pat. No. 3,904,579 proposes non-asbestos tile formulations which preferably do not contain any fibers. U.S. Pat. No. 3,931,094 and U.S. Pat. No. 3,336,259 disclose filled resin systems including inorganic fibers and which are suitable for making extruded products.

SUMMARY OF THE INVENTION

In accordance with this invention, plastic formulations and plastic tiles produced from such formulations are disclosed in which a low density organic, fibrous filler, which is normally not easily dispersed in the formulation, may be more easily and uniformly dispersed, avoiding visible clumps of fiber in the fiber formation. Furthermore, plastic formulations which are tough and strong at room temperature, yet which are soft enough at elevated temperatures to be effectively rolled into sheeting of the desired thickness, are provided by this invention.

Furthermore, in accordance with this invention, it is possible to use less than 20 percent by weight of plasticized resin component in the formulations and tile of the invention. This is considerably less of the relatively expensive resin than has been conventionally required in conjunction with asbestos-filled formulations.

The plastic formulation of the invention suitable for manufacture of the tile of the invention comprises a plasticized normally solid resin, an organic fibrous filler not easily dispersed in the formulation and having a specific gravity between about 1 and about 1.5, from about 20 to about 50 wt% based on the formulation of particulate filler of a particle size no more than about 20 microns in uniform dispersion in the formulation and between about 20 and about 60 wt% based on total formulation of particulate filler of a particle size between about 20 and about 200 mesh. Particulate filler used in formulations and tile of the invention should contain no more than about 1 wt% particles larger than 20 mesh and no more than about 15 wt% particles in the size range between 20 microns and 200 mesh. The resin may be chlorinated polyethylene, hydrocarbon resin, vinyl chloride/vinyl $C_2$–$C_4$ alkanoate copolymer, vinylidene chloride/vinyl chloride copolymer, vinyl chloride/propylene copolymer or mixtures thereof. Preferred embodiments of the invention include formulations in which the resin is chlorinated polyethylene or is a vinyl chloride/vinyl acetate copolymer having at least about 70% vinyl chloride units and less than about 30% vinyl acetate units, more preferably between about 5% and about 20% vinyl acetate units and in which plasticizer is present in amounts between about 15 and about 40 wt% based on resin. Calcium carbonate is a particularly preferred particulate filler.

DETAILED DESCRIPTION OF THE INVENTION

As mentioned above, a plastic formulation is disclosed suitable for the manufacture of tile and the like. The formulation comprises an intimate mixture of a customary plasticized resin of a desirable type for plastic formulations, and a low density organic, fibrous filler. The formulation and tile of the invention also comprise, in uniform dispersion, from 20 percent to 50 percent by weight of particulate filler having a particle size of no more than about 20 microns and between about 20 and about 60 wt% based on total formulation of particulate filler of a particle size between about 20 and about 200 mesh. It has been found that the presence of particulate filler, and particularly calcium carbonate particles, of these size ranges and in the concentrations specified, permits the uniform dispersion of the organic, fibrous filler with greater ease.

It is particularly preferred for the plastic formulations of this invention to be essentially free of asbestos, thus avoiding toxicity problems during and after manufacture of the formulations. Furthermore, the asbestos-free formulations of this invention can utilize reduced amounts of resin ingredient and plasticizer, usually less than 20 percent by weight, while the best asbestos-containing formulations utilize over 20 percent by weight of resin and plasticizer.

The term "essentially free of asbestos" is intended to describe compositions containing no asbestos or compositions containing an extremely small amount of asbestos such as up to about 2 wt%, which does not significantly influence the properties of the final product or introduce health hazards.

It is generally most preferred for the particulate filler of less than 20 micron size used in this invention to have a particle size of less than 10 microns, for example, with an average particle size of 4 to 5 microns. Furthermore, other filler materials may be used in substitution for calcium carbonate particles, athough many of them have known drawbacks. For example, talc would be suitable in some instances, except for a possible toxicity problem similar to that of asbestos. Silica may be used except that it exhibits an undesirable abrasive action on the processing machinery. Carbon black may be used if a black formulation is desired. Titanium dioxide may be used, but is undesirably expensive.

As mentioned above, the preferred particulate filler of less than 20 micron size range is calcium carbonate. While such fine ground calcium carbonate may be obtained from any suitable source, limestone is a convenient and economical material for use as the fine ground calcium carbonate of the invention. Other suitable sources such as aragonite, synthetically prepared calcium carbonate etc., may also be used. While the purity of the calcium carbonate used is not critical, it is generally preferred that calcium carbonate used is not critical, it is generally preferred that calcium carbonate having a purity of at least 95% be used. A particularly suitable calcium carbonate for this purpose is available under the tradename ATOMITE and has the following particle size distribution: 25% less than 1 micron; 50% less than 2.5 microns; 80% less than 5 microns; 98% less than 10 microns; 100% less than 15 microns.

In addition to the 20 to 50% filler having a particle size less than 20 microns, coarse filler of a size range between about 20 and about 200 mesh is required in amounts between about 20 and about 60 wt% of the formulation. In general, coarse filler may be of the same or different composition as the less than 20 micron filler with coarse ground limestone being preferred filler for this purpose.

To ensure proper dispersion of fibers and processing of the formulation, particulate filler between 20 micron and 200 mesh particle size (i.e. capable of passing through a 200 mesh screen but having particle size greater than 20 microns) should not be present in amounts exceeding about 15 wt% of the total formulation. Particulate filler of a particle size greater than 20 mesh (i.e. retained on a 20 mesh screen) should not be present in amounts exceeding about 1 wt% of the total formulation.

The resin ingredient of this invention may be any desired plastic resin suitable for making plastic compounds as desired. For example, conventional vinyl chloride-vinyl acetate copolymers plus appropriate plasticizers may be used.

The term "normally solid" as applied to the resins used in the invention is intended to describe those polymers which are normally solid and thermoplastic at room temperature and which can be processed on conventional equipment for producing conventional vinyl tiles. Such equipment is frequently operated at temperatures of the range of about 150°-300° F.

Suitable resins include for instance normally solid resins such as vinyl chloride/vinyl $C_2$-$C_4$ alkanoate copolymer, vinylidene chloride/vinyl chloride copolymer, vinyl chloride/propylene copolymer, hydrocarbon resins and chlorinated polyethylene.

Vinyl chloride/vinyl $C_2$-$C_4$ alkanoate copolymers useful in the invention include vinyl chloride/vinyl acetate copolymer, vinyl chloride/vinyl propylene copolymer and vinyl chloride/vinyl butyrate copolymer. A strongly preferred embodiment of the invention utilizes vinyl chloride/vinyl acetate copolymer. The polymerized vinyl chloride portion of the copolymer preferably comprises at least about 70 wt% and the polymerized vinyl $C_2$-$C_4$ alkanoate portion up to about 30 wt% based on weight of the copolymer. More preferaably the copolymer comprises between about 80 and about 95 wt% polymerized vinyl chloride portion and from about 5 to about 20 wt% polymerized vinyl $C_2$-$C_4$ alkanoate portion.

Vinylidene chloride/vinyl chloride copolymers useful in the invention are primarily those in which the polymerized vinyl chloride portion of the copolymer comprises at least about 50 wt% and the vinylidene chloride portion up to about 50 wt% of the weight of the copolymer. More preferably the vinyl chloride portion comprises from about 50 to about 90 wt% and the vinylidene chloride portion from about 10 to about 50 wt% of the copolymer.

Vinyl chloride/propylene copolymers useful in the invention frequently comprise at least about 90 wt% vinyl chloride portion and from about 4 to about 10 wt% propylene portion, more preferably between about 90 and about 96 wt% vinyl chloride portion.

Suitable hydrocarbon resins for use in the invention include for instance polyethylene; poly(ethylene-acrylic acid); poly(alpha-methyl styrene); synthetic rubbers such as sytrene/butadiene, butadiene/acrylonitrile, etc.; wood or petroleum based resins.

Preferred chlorinated polyethylene polymers useful in the invention are those in which chlorine accounts for at least about 30% of the polymer weight and in which the polymer crystallinity does not exceed about 20% and more preferably approaches 0%. Preferred chlorinated polyethylene polymers also have molten viscosities from about 10,000 to about 30,000 poises at 190° C.

Inherent viscosity of copolymers used in the invention preferably ranges between about 0.35 and about 0.9, more preferably from about 0.4 to about 0.6. Inherent viscosity (IV) as used herein applies to viscosities determined in accordance with ASTM method D-1243-66 using 0.2 gram of polymer in 100 mil of cyclohexanone at 30° C.

Plasticizers suitable for use in plasticizing resins used in the invention may include any of the plasticizers commonly used for such purpose. The particular plasticizer of choice will be influenced to a significant extent by it's compatability with the overall formulation and the properties desired in the plasticized product. Suitable plasticizers include for instance, esters of aliphatic hydric compounds and aliphatic carboxyl compounds such as dibutyl sebacate, dicotyl sebacate, dioctyl adipate, didecyl adipate, dioctyl acelate, triethylene glycol di(2-ethylhexanoate), diethylene glycol diperlargonate, triethylene glycol dicaprylate, and the like; esters of aliphatic alcohols and aromatic acids, or aromatic alcohols and aliphatic acids, or aromatic alcohols and aromatic acids, including dibutyl phthalate, dicapryl phthalate, dioctyl phthalate, diisononyl phthalate, dipropylene glycol dibenzoate, butyl benzyl sebacate, butyl benzyl phthalate, dibenzyl sebacate, dibenzyl phthalate, and the like. Other types of plasticizers such as esters of inorganic acids, including tricresyl phospate, octyl diphenyl phosphate, and the like; alkyd derivatives of rosin; chlorinated paraffine; high molecular weight hydrocarbon condensates and the like; can also be used. The plasticizer should preferably have a low vapor pressure at the temperatures required to fuse the resin. A vapor pressure of 2 millimeters of mercury or less at 400° F. is usually considered satisfactory. The plasticizer is employed in a plasticizing amount which is sufficient to provide the mechanical properties which are desired in the end use application. Normally a satisfactory range of plasticizer, including mixtures thereof, is from about 25 parts by weight, and lower, to about 45 parts by weight, and higher, per 100 parts by weight of total polymer binder.

If desired, small amounts of antioxidants such as the hinderedphenols, e.g., di-t-butyl-p-creson, and lubricants such as stearic acid, waxes, etc., may be incorporated into the novel compositions thereby obtaining further improved milling and calendering characteristics.

In a preferred embodiment of the invention, the normally solid resin comprises a mixture of vinyl chloride/-vinyl acetate and chlorinated polyethylene with the ratio of vinyl chloride/vinyl acetate to chlorinated polyethylene preferably being between about 5 to 1 and about 2 to 1.

Plastic formulations and tiles of this invention may preferably include, in addition to the ingredients mentioned above, minor amounts such as between about 4 and about 10 percent by weight based on total formulation of a vinyl chloride/vinyl $C_2$-$C_4$ alkanoate/$C_2$-$C_4$ alkene terpolymer, preferably a random terpolymer.

Typical of the normally-solid thermoplastic vinyl chloride/vinyl $C_2$-$C_4$ alkanoate/$C_2$-$C_4$ alkene terpolymers which are useful in the invention include, by way of illustration, vinyl chloride/vinyl acetate/ethylene terpolymer, vinyl chloride/vinyl acetate/propylene terpolymer, vinyl chloride/vinyl acetate/butylene terpolymer, vinyl chloride/vinyl propionate/ethylene terpolymer, vinyl chloride/vinyl propionate/propylene terpolymer, vinyl chloride/vinyl propionate/butylene terpolymer, vinyl chloride/vinyl butyrate/ethylene terpolymer, vinyl chloride/vinyl butyrate/propylene terpolymer, and vinyl chloride/vinyl butyrate/butylene terpolymer. The polymerized vinyl chloride portion of the terpolymer comprises the major portion by weight and, in general, desirably comprises at least about 75 weight percent of the terpolymer. The polymerized vinyl $C_2$-$C_4$ alkanoate portion of the terpolymer normally comprises less than about 24.5 weight percent whereas the polymerized alkene portion comprises at least about 0 5 weight percent. Polymerized vinyl $C_2$-$C_4$ alkanoate represents the major component with respect to the polymerized alkene portion. Highly suitable terpolymer comprises, polymerized therein, from about 80 to about 90 weight percent chloride, from about 9 to about 17 weight percent vinyl $C_2$-$C_4$ alkanoate, and from about 1 to about 3 weight percent ethylene. The preferred terpolymer is vinyl chloride/vinyl acetate/ethylene (branched poly(ethylene-vinyl chloride-vinyl acetate) comprising from about 4 to about 10% by weight of the tile formulation and in which vinyl chloride units comprise from about 80 to about 90 wt% of the terpolymer, more preferably between about 85 and about 90 wt% of the terpolymer with vinyl acetate units comprising from about 7 to about 14 wt% and ethylene units from about 1 to about 3 wt% of the terpolymer. The preferred terpolymer is a random terpolymeer.

The above terpolymers preferred for use in the invention generally have inherent viscosity values from about 0.5 to about 0.8 and are preferably prepared by simultaneous polymerization of the 3 monomeric ingredients.

A particularly preferred branched terpolymer resin for use in the invention contains about 89 percent by weight of vinyl chloride units, about 9.6 percent by weight of vinyl acetate units, and about 1.5 percent by weight of ethylene units. The composition may be manufactured by grafting vinyl chloride onto an ethylene-vinyl acetate copolymer or more preferably by simultaneous reaction of all three monomers. The material may have a relative viscosity as a 0.5 wt% solution in tetrahydrofuran at 25° C. of about 1.42

One suitable resin ingredient for use with conventional vinyl chloride-vinyl acetate resins is manufactured by the Union Carbide company under the name "VNAT resin". This material has been found to be exceptionally desirable as an ingredient for plastic formulations intended to be milled at high temperatures into flexible asbestos-free tile.

Another suitable resin ingredient for use in the formulation of this invention may comprise a mixture of (a) 5.6 parts by weight of a high molecular weight vinyl chloride-vinyl acetate copolymer containing 14 percent by weight acetate units, and having an inherent viscosity of about 0.71 as indicated by ASTM Method D1243-66 (Method A); plus (b) 2.8 parts by weight of chlorinated polyethylene resin. Such a type of vinyl chloride-vinyl acetate copolymer is also made by the Union Carbide Company. The chlorinated polyethylene resin preferably contains about 45 percent by weight of chlorine, and may have a viscosity of 20,000 poises as measured by an Instron Rheometer at 190° C. and a 150 $sec.^{-1}$ shear rate.

Conventional tile resins, such as Firestone 4301, a vinyl chloride-vinyl acetate resin, are also customarily included. The Firestone 4301 resin has a relative viscosity, as a 0.5 wt% solution in tetrahydrofuran at 25° C. of 1.24 and has an inherent viscosity of about 0.44 to 0.50 as measured by ASTM Method D1243-66.

Formulations and tiles of the invention may contain widely varying amounts of plasticized resin but will generally contain between about 10 and about 30 wt% resin component (resin and plasticizer combined). Since one of the advantages of the invention is that lesser amounts of resin need be used than normal, the preferred embodiments will contain from 10 to less than about 20% by weight of the resin component.

The organic fibrous filler utilized in this invention may be a synthetic fiber such as Dacron (polyethylene terephthalate), nylon or other polyester or the like. Natural fiber such as cellulosic fibers (e.g., cotton, wood, etc.) may, however, also be used. Polyester or cellulosic fibers are preferred. Fibrous filler suitable for the present invention has a specific gravity between about 1 and about 1.5 as compared with the specific gravities of about 2.5 which are common for generally used inorganic fibers such as glass or asbestos.

An especially suitable fiber filler is a natural, unregenerated cellulosic fiber of vegetable origin available under the trade name SANTOWEB. This material has a diameter of about 10$\mu$, a specific gravity of about 1.15 and an aspect ratio (length to diameter) of about 150 to 200.

The fibers used are typically between about 0.0001 to 0.001 inch in width and may, on the average, each be about 0.01 to 0.15 inch long. Preferably, about 0.5 to about 10 percent by weight of organic fibers, more preferably about 1 to about 4 percent, are present in the formulation of this invention, with 3 percent by weight being the most generally preferred, maximum.

It is also preferred for the formulation of this invention to contain, typically, from about 0.5 to 2 percent by weight of a thermoplastic (i.e. low crosslink density butadiene-acrylonitrile rubber, which can serve as a solid plasticizer, and which also increases the impact resistance of the formulation at high temperatures in a way not provided by other materials generally thought to be plasticizers, such as polycarpolactone. Preferred butadiene-acrylonitrile rubbers for such use contain between about 25 and about 40 percent acrylonitrile units and have viscosities between about 2000 and about 3000 centipoises (cps) as a 20 percent solution in methyl ethyl ketone. In particular, a suitable thermoplastic butadiene-acrylonitrile rubber is Hycar 1452P which is available from the B. F. Goodrich Chemical Company. This material contains about 33 percent by weight of acrylonitrile units, and has a viscosity, as a 20 wt% solution in methyl ethyl ketone, of about 2500 cps.

Small amounts of stabilizers are also preferably incorporated into the formulations and tiles of the invention to reduce the effects of degradation by light and heat. Such stabilizers are usually added in amounts between 0.5 and about 5 wt% of the resin component of the formulation and tiles of the invention.

Suitable light stabilizers include epoxidized soya bean oil, epoxidized tallates, wood rosin, phosphites, resorcinol disalicylate, resorcinol dibenzoate, phenyl phthalate, phenyl benzoate, o-tolyl benzoate, eugenol, guaiacol, o-nitropenol, o-nitraniline, triethylene glycol salicylate, and organic phosphates and other complexes of such metals as barium, cadmium, strontium, lead, tin and the like. Suitable heat stabilizers includes barium-cadmium soaps, barium-cadmium-zinc soaps, epoxides, sulfides and sulfites of silver, calcium, cadmium, magnesium, cerium, sodium strontium and the like, glycerine, leucine, alanine, o-and p-amino benzoic and sulfanilic acids, hexamethylene tetramine, weak acid radicals including oleates, recinoleates, abietates, salicylates and the like. If desired, small amounts of antioxidants such as the hindered phenols, e.g., di-t-butyl-p-cresol, and lubricants such as stearic acid, waxes, etc., may be incorporated into the novel compositions thereby obtaining further improved milling and calendering characteristics.

In addition to the ingredients mentioned above, other ingredients generally in weight proportions of between 0.5 and about 5% may be added to the formulation of the invention as desired. Such additional ingredients may include, for instance, mixing and wetting aids such as wood or tall oil rosin, processing aids such as poly(alpha-methyl styrene) etc. Poly (alpha-methyl styrene) is especially beneficial as a processing aid since this material serves as a lubricant at the high processing temperatures usually used. This material softens at 210° F. but is a solid at room temperature.

The preferred formulations of this invention can be formed into tile as desired by rolling, milling, or extrusion at elevated temperatures, while at the same time they have high strength and relatively low elongation at lower temperatures, due to fiber reinforcement, as is characteristic of high quality plastic tiles.

Any of the well known methods for forming tile from suitable plastic formulation may be used. For instance, tile formulations of the invention may be prepared by mixing resins, plasticizer, filler, pigments (if used) and stabilizer together at temperatures above the softening point of the various polymers used, (usually between about 250° and about 375° F.). The mixing operation may preferably be carried out in conventional equipment such as a Banbury mixer at temperatures of e.g. 250°–400° C. and the mixed composition then fed to a two roll mill to convert the resulting fused mixture into a flat sheet suitable for calendering. In a typical operation, the front roll of the two roll mill is operated at a temperature between about 210° and about 240° F. while the back roll is operated at a temperature between 290° F. and about 320° F. The resulting sheet can then be calendered in a conventional manner to the desired thickness and smoothness or surface and can then be cut into appropriate shaped tiles as desired.

The formulations of this invention may, of course, be used in any other desired way besides making plastic tiles, where fiber reinforcement is desired in a plastic compound, and where there is a need for the plastic fibers to be well dispersed. In tile manufacture, particularly where the formulation is rolled, it has been found that poorly dispersed organic fibers in the formulation cause the plastic to fail to adhere adequately to the rollers for processing. Accordingly, such material cannot be easily worked into uniform sheeting, from which the tiles are cut.

However, in accordance with this invention, when the organic fibers are uniformly dispersed without encountering sufficient shearing action or heat to degrade them, the resulting formulation adheres to the processing rollers in a desirable manner for effective fabrication of tiles or the like.

The examples below are intended to provide illustrative embodiments of the invention of this application, and are not intended to define the scope of the invention, which is as defined in the claims below. All parts and proportions referred to herein and in the appended claims are by weight unless otherwise indicated.

EXAMPLE 1

A floor tile formulation was prepared from the following ingredients:

| | | Parts by Weight |
|---|---|---|
| (A) | A vinyl cloride-vinyl acetate copolymer resin (such as Firestone 4301) | 5.3 |
| | VNAT resin of Union Carbide (see above for detailed description) | 5.7 |
| | A plasticizer mixture of 97 percent by weight of diisononyl phthalate, plus 3 percent by weight of epoxidized soy bean oil | 2.7 |
| | A butadiene-acrylonitrile thermoplastic rubber (Hycar 1452P) | 1 |
| | Stabilizers (Ba/Ca soaps) | 0.8 |
| | Poly(alpha-methyl-styrene-Amoco 18-210) | 0.8 |
| | Tall oil rosin (Reichold Chemical Company) | 0.8 |
| | Powdered calcium carbonate of less than 20 micron particle size and having an average particle size of 4.5 microns (ATOMITE) | 25 |

-continued

| | Parts by Weight |
|---|---|
| 40 Mesh Crushed Limestone | 53.9 |
| White Pigment | 1 |
| Organic fibers (Dacron 1938 - Danberg Chemical Co., Wallingford, Conn.) | 3 |

The above mixture was mixed in a Baker-Perkins mixer until flux is achieved (about 6 minutes), and then about 1½ more minutes, at about 240° to 250° F. (final mixture temperature). The mixture is then milled for about one minute, the front roll being at 240° F. and the back roll about 300° F. The resulting product is then calendered twice, the top roll being at 200°–210° F. and the bottom roll being about 70°–80° F. The first calender pass was set to reduce the thickness of the formula to 0.09 inch. The second calender pass was set to reduce the thickness to 0.065 inch.

The resulting product exhibited good plasticity, tack (ability to adhere to the roll for processing without being excessively adhesive thereto), hot strength, and dimensional stability (at 75° C.). The material also exhibited satisfactory physical propeties (such as tensile strength) at room temperature, and accordingly is suitable for use as a plastic tile material, comparable in performance to vinyl-asbestos tile.

(B) A similar material was formulated in the manner of Example 1A, with the exception that the 4.5 micron calcium carbonate powder ingredient was replaced completely with 40 mesh crushed limestone; 0.3 part by weight of the plasticizer mixture ingredient was replaced with 40 mesh limestone; and 1.8 extra parts by weight of 40 mesh limestone were added.

It was noted that the Dacron fibers did not mix well into the composition, but instead tended to agglomerate together into clumps. Apparently as the result of this, the resulting composition did not adhere well to the roll during the rolling process, which made it difficult to form it into smooth, blemish-free sheeting prior to cutting into tiles. Furthermore, the composition appeared to have reduced tensile strength for purposes of tensile testing at temperatures ranging from 77° F. to 180° F., when compared with the composition of Example 1.

The specific tensile testing utilized herein was based upon ASTM D-1708-66 (Reapproved 1970), except that a rectangular strip of sample was used, and not a dumbbell shaped sample. The specific tensile results at a stretching rate of 2 inches per minute and at various temperatures are as indicated below:

| Temperature | Tensile Strength Material of Example 1A (psi) | Tensile Strength Material of Example 1B (psi) |
|---|---|---|
| 77° F. (machine direction) | 1051.9 | 578.1 |
| (Across machine direction) | 444.5 | 330.6 |
| 140° F. (machine direction) | 449.8 | 200.0 |
| 180° F. (machine direction) | 153.0 | 68.7 |
| (Across machine direction) | 26.1 | 26.1 |

EXAMPLE 2

Other formulations were made in accordance with this invention, containing ingredients as indicate in the Table below:

| Ingredient | Formulation No. and Ingredient Amounts in Parts by Weight | | | | | |
|---|---|---|---|---|---|---|
| | 1 | 2 | 3 | 4 | 5 | 6 |
| A vinyl chloride-vinyl acetate copolymer resin (14 percent acetate) | 5.3 | 5.3 | 5.3 | 5.3 | 12 | 5.6 |
| VNAT Resin of Union Carbide | 5.7 | 5.7 | 5.7 | 5.7 | — | 5.6 |
| A plasticizer mixture of 97 percent by weight diisononyl phthalate, plus 3 percent by weight of epoxidized soybean oil | 2.4 | 2.4 | 2.4 | 2.4 | 2.5 | 2.7 |
| Butadiene-acrylonitrile thermoplastic rubber (Hycar 1452P) | 1.0 | 1.0 | 1.0 | 1.0 | — | 1.0 |
| Stabilizer (AG717-Tenneco) | 0.5 | 0.5 | 0.5 | 0.5 | 1.0 | 0.5 |
| Poly(alpha-methyl styrene) (Amoco 18-210) | 0.8 | 0.8 | 0.8 | 0.8 | 0.8 | 1.0 |
| Tall Oil Rosin (Reichold Chemical Co.) | 0.8 | 0.8 | 0.8 | 0.8 | 0.7 | 0.6 |
| Powdered calcium carbonate of less than 20 micron particle size and average particle size of 4.5 microns | 59 | 58 | 59 | 58 | 25 | 30 |
| 40 Mesh Crushed Limestone | 22.5 | 22.5 | 22.5 | 22.5 | 51 | 50 |
| White pigment (TiO$_2$) | 1.0 | 1.0 | 1.0 | 1.0 | 2.5 | 1 |
| Dacron Polyester 1938 fibers (Danberg Chemical Co.) | 1.0 | 2.0 | — | — | 4 | 2.0 |
| Nylon Fibers (Danberg Chemical Co.) | — | — | 1.0 | 2.0 | — | — |
| Flexol EPO | — | — | — | — | 0.5 | — |

In all of these formulas, the mixing of the organic fibers into uniform dispersion was adequate, and the materials had fair to good mill tack, permitting them to be retained on the mill rollers for processing. The materials also had fair to good plasticity and hot strength, as is needed for good processing of the formulations.

Each of the materials was mixed and processed in accordance with Example 1.

EXAMPLE 3

850 pounds of a plastic formulation was prepared containing the following ingredients;

| Ingredient | Ingredient Amounts in Parts by Weight |
|---|---|
| A vinyl chloride-vinyl acetate copolymer resin (14 percent acetate) | 5.1 |
| VNAT Resin of Union Carbide | 5.6 |
| A plasticizer mixture of 97 percent by weight diisononyl phthalate, plus 3 percent by weight of epoxidized soybean oil | 2.6 |
| Butadiene-acrylonitrile thermoplastic rubber (Hycar 1452P) | 1 |
| Poly(alpha-methyl styrene) (Amoco 18-210) | 0.8 |
| Tall Oil Rosin (Reichold Chemical Co.) | 0.8 |
| Dacron Polyester 1938 fibers (Danberg Chemical Co.) | 3 |
| Powdered calcium carbonate of less than 20 micron particle size and average particle size of 4.5 microns | 27 |

Each of the materials was mixed and processed in accordance with Example 1.

EXAMPLE 3

850 pounds of plastic formulation was prepared containing the following ingredients.

| Ingredient | Ingredient Amounts in Parts by Weight |
|---|---|
| A vinyl chloride-vinyl acetate copolymer resin (14 percent acetate) | 5.1 |
| VNAT Resin of Union Carbide | 5.6 |
| A plasticizer mixture of 97 percent by weight diisononyl phthalate, plus 3 percent by weight of epoxidized soybean oil | 2.6 |
| Butadiene-acrylonitrile thermoplastic thermplastic rubber (Hycar 1452P) | 1 |
| Poly(alpha-methyl styrene) (Amoco 18-210) | 0.8 |
| Tall Oil Rosin (Reichold Chemical Company) | 0.8 |
| Dacron Polyester 1938 Fibers (Danberg Chemical Co.) | 3 |
| Powdered calcium carbonate of less than 20 micron particle size and average particle size of 4.5 microns | 27 |
| 40 Mesh Crushed Limestone | 52.6 |
| White Pigment (TiO$_2$) | 1 |
| Stabilizer (AG 717-Tenneco) | 0.5 |

The formulation was processed on a commercial milling line for tile manufacture at the manufacturing facility of the GAF Consumer Products Division in Vails Gate, New York. The resulting formulation was noted to have good mill track (adhesion to the mill for processing). Optimum results were obtained with a mix time for the formulation of 1 minute and 55 seconds in a Banbury mixer at 330° F., with the best mill tack being obtained when the front mill roll is heated to 240° F. and the back mill roll 300° F. On the milling line, the first calendering top roll was maintained at a temperature of 218° to 220° F. with the guage of the rolled plastic formulation beig 0.09 to 0.095 inch thick, after the first calendering step. The amperage consumption of the first calender was 100 to 120 amps.

The second calendering top roll was maintained at 240° to 250° F., and the guage of the formulation after the second calendering roll step was 0.063 to 0.065 inch, with an amperage consumption of the second calender being 60 to 70 amps. A Planisher (smoothing) station was provided at a temperature of 175°–180° F., for finishing the rolled sheet prior to cutting into tile.

The resulting cut tile had an impact resistance that was generally equivalent to commercial vinyl asbestos tile, but with an Instron flexibility rating that was marginally lower than commercial vinyl asbestos tile at 50° F. and at 77° F. The dimensional stability and the tensile strength at 140° F. and 180° F. was generally equivalent to commercial vinyl asbestos tile, although the tensile strength at 50° F. and 77° F. and the abrasion resistance, were slightly lower.

The tile prepared in accordance with this Example is generally of high quality and suitable for commercial usage, although it contained no asbestos, and utilized only 13.3 percent by weight of resin and plasticizer ingredient, when compared with the substantially higher resin and plasticizer usage of asbestos-filled tile formulation. (Usually about 25 percent).

EXAMPLE 4

A plastic formulation was prepared including the following ingredients:

| Ingredient | Ingredient Amounts in Parts by Weight |
|---|---|
| A vinyl chloride-vinyl acetate copolymer resin (14 percent acetate) | 5.6 |
| A high molecular weight vinyl chloride-vinyl acetate copolymer (14 percent by weight acetate) (VSKK Resin-Union Carbide Co.) | 2.8 |
| Chlorinated polyethylene (45 percent by weight of chlorine, viscosity by Instron Rheometer at 190° C. and a 150 sec. −1 shear rate-20,000 poises) | 2.8 |
| A plasticizer mixture of 97 percent by weight diisononyl phthalate, plus 3 percent by weight of epoxidized soybean oil | 2.6 |
| Butadiene-acrylonitrile thermoplastic rubber (Hycar 1452P) | 1 |
| Stabilizer (AG 717-Tenneco) | 0.5 |
| Poly(alpha-methyl styrene) (Amoco 18-210) | 1 |
| Tall Oil Rosin (Reichold Chemical Company) | 2 |
| Dacron Polyester 1938 Fibers (Danberg Chemical Company) | 2 |
| Powdered calcium carbonate of less than 20 micron particle size and average particle size of 4.5 microns (Atomite) | 30 |
| 40 Mesh Crushed Limestone | 50 |
| White Pigment (TiO$_2$) | 1 |

The resulting product was mixed while heating in a Baker-Perkins Mixer for 2½ minutes. Thereafter, it was found to have good plasticity, tack and hot strength, with the Dacron fibers being uniformly mixed. It exhibited the following tensile strengths as tested in the manner of Example 1:

| 77° F. | 734.4 psi |
|---|---|
| 140° F. | 201.2 psi |
| 180° F. | 94.4 psi |

The material also had good impact strength and other properties making it potentially useful as a tile formulation.

EXAMPLE 5

The following formulations were made in accordance with this invention, containing ingredients as indicated in the table below:

| Ingredient | Formulation No. and Ingredient Amounts in Parts by Weight | | |
|---|---|---|---|
| | 7 | 8 | 9 |
| A vinyl chloride-vinyl acetate copolymer resin (14 percent by weight) (VCJE-10 resin-Union Carbide Corporation) | 5.1 | 5.1 | 4 |
| VNAT Resin of Union Carbide | 5.6 | 5.64 | 6.8 |
| Diisononyl phthalate plasticizer | 2.6 | 2.6 | 2.6 |
| Butadiene-acrylonitrile thermoplastic rubber (Hycar 1452P) | 1 | 1 | 1 |
| Tall Oil Rosin | 0.8 | 0.8 | — |

-continued

| Ingredient | Formulation No. and Ingredient Amounts in Parts by Weight | | |
|---|---|---|---|
| | 7 | 8 | 9 |
| Poly(alpha-methyl styrene) | 0.8 | 0.8 | 1.2 |
| Barium/Cadmium soap stabilizer (March-140, Argus Chemical Corp.) | 0.8 | 0.5 | 0.8 |
| Polyester 1892 fibers from Danberg Chemical Company | 3 | 2 | 2.5 |
| Powdered calcium carbonate of less than 20 micron particle size and average particle size of 4.5 microns | 27 | 22.5 | 40 |
| 40 Mesh Crushed Limestone | 52.3 | 58.05 | 41 |
| Titanium Dioxide Pigment | 1 | 1 | — |

The formulations were mixed and rolled into a sheet in the manner of Example 1, to form plastic tiles which are comparable in performance with vinyl-asbestos tile of conventional formulation.

EXAMPLE 6

A floor tile formulation was prepared from the following ingredients:

| Ingredient | Amount |
|---|---|
| Vinyl chloride-vinyl acetate copolymer (86% vinyl chloride, 14% vinyl acetate) | 8.99 Parts by Weight |
| Diisononyl phthalate plasticizer | 2.75 Parts by Weight |
| Butadiene-acrylonitirle thermoplastic rubber (68% butadiene, 33% acrylonitrile | 0.75 Parts by Weight |
| Stabilizers | 0.74 Parts by Weight |
| Poly(alpha-methyl styrene) | 1.0 Parts by Weight |
| Tall Oil Rosin | 0.69 Parts by Weight |
| Powdered Calcium Carbonate (Atomite) | 36.61 Parts by Weight |
| 40 Mesh Crushed Limestone | 43.35 Parts by Weight |
| White Pigment | 1.00 Parts by Weight |
| Modified Cellulosic Fiber (Santoweb) | 2.25 Parts by Weight |
| Chlorinated polyethylene (36% chlorine, 17% crystallinity viscosity - 27,000 poieses) | 2.87 Parts by Weight |

The above mixture was mixed in a Baker-Perkins mixer until flux was achieved (about 6 minutes), and then about 1½ more minutes, at about 240°–250° F. (final mixture temperature). The mmixture was then milled for about one minute, the front roll being at 240° F. and the back roll about 300° F. The resulting product was then calendered twice, the top roll being at 200°–210° F. and the bottom roll being about 70°–80° F. The first calender pass was set to reduce the thickness of the formula to 0.99 inch. The second calender pass was set to reduce the thickness to 0.065 inch.

The resulting product exhibited good plasticity, tack (ability to adhere to the roll for processing without being excessively adhesive thereto), hot strength, and dimensional stability (at 75° C.). The material also exhibited satisfactory physical properties (such as tensile strength) at room temperature and accordingly is suitable for use as a plastic tile material, comparable in performance to vinyl-asbestos tile.

EXAMPLE 7

Floor tile was made from the following formulations in accordance with the invention:

| Ingredient | Formulation No. and Ingredient Amounts in Parts by Weight | |
|---|---|---|
| | 10 | 11 |
| Vinyl chloride-vinyl acetate copolymer (15 wt % vinyl chloride) | 8.7 | 10.7 |
| VNAT Resin of Union Carbide | 5.0 | — |
| Chlorinated Polyethylene (45 wt % chlorine-viscosity 20,000 cp) | — | 3.0 |
| Diisononyl phthalate plasticizer | 3.3 | 3.3 |
| Butadiene-acrylonitrile rubber (Hycar 1452P) | 1.0 | 1.0 |
| Santoweb cellulosic fiber | 3.5 | 3.5 |
| Calcium Carbonate of less than 20 micron size (Average particle size 4.5 micron-Atomite) | 35.7 | 35.7 |
| Barium/Cadmium Stabilizer (Ferro 1958) | 0.6 | 0.6 |
| Calcium Carbonate between 20 and 200 mesh particle size (40 mesh crushed limstone | 41.2 | 41.2 |
| Pigment | 1.0 | 1.0 |

EXAMPLE 8

In order to evaluate the effectiveness of fillers of various particle sizes in plastic formulations and tiles of the invention, tile formulations 12–15 were made as described herein using various particle sizes of calcium carbonate filler. These formulations were identical to formulation No. 10 of Example 7 except for the particle sizes of the calcium carbonate filler. In all cases total calcium carbonate filler was about 77 weight percent of the total formulation.

The tile making procedure used was to mix the ingredients in a Baker-Perkins mixer until flux was achieved (about 2.5 minutes) and then for an additional 30 seconds before dropping the batch from the mixer at a temperature of 270° F. The batch was then milled for about one minute with a front roll temperature of 210°–220° F. and a back roll temperature of 290°–310° F. Where possible (i.e. where the formulation had sufficient hot strength and mill tack) the resulting product was then calendered twice to a final thickness of 0.065 inch and cut into sample tiles which were tested for physical properties such as dimensional stability, water growth, flexibility, indentation and tensile strength. Throughout the procedure the formula being used was examined for mixing, milling, calendering and hot strength characteristics.

Formulation No. 12 contained 77 wt% of a 40 mesh limestone having the following size distribution:
0.2 wt% retained on 40 mesh screen
28.5 wt% retained on 60 mesh screen
41.0 wt% retained on 100 mesh screen
23.5 wt% retained on 200 mesh screen
3.8 wt% retained on 325 mesh screen
3.0 wt% passed through 325 mesh screen This material was mixed but could not be milled or calendered. Hotstrength was insufficient and the material would not stick to the roll of the mill after going through the nip.

Formulation No. 13 contained 77 wt% of a 200 mesh limestone having the following size distribution:
0.4 wt% retained on 40 mesh screen
2.6 wt% retained on 60 mesh screen 7.9 wt% retained on 100 mesh screen
23.2 wt% retained on 200 mesh screen
20.2 wt% retained on 325 mesh screen
45.7 wt% passed through 325 mesh screen
This material behaved essentially the same as Formulation No. 12 and could not be milled or calendered.

Formulation No. 14 contained 35 wt% of the 200 mesh limestone used in formulation 13 plus 42 wt% of the 40 mesh limestone used in Formulation No. 12. This material behaved in a manner essentially the same as formulations 12 and 13 and could not be milled or calendered.

Formulation No. 15 contained 77 wt% of the Atomite brand calcium carbonate described above. This material was successfully milled and calendered, although the mix was hard to mill. The resulting tile made from this formulation was, however, very brittle and was not sufficiently flexible.

This invention has been disclosed with respect to certain preferred embodiments, and it will be understood that various modifications and variations thereof obvious to persons of ordinary skill in the art are included within the spirit and purview of this application.

What is claimed is:

1. A plastic formulation suitable for the manufacture of tile and the like, said formulation being essentially free of asbestos and comprising an intimate mixture of:
   (a) plasticized, normally solid resin selected from the group consisting of vinyl chloride/vinyl $C_2$–$C_4$ alkanoate copolymer, vinylidine chloride/vinyl chloride copolymer, vinyl chloride/propylene copolymer, hydrocarbon resins, chlorinated polyethylene and mixtures thereof;
   (b) an organic fibrous filler not easily dispersed in said formulation, said organic filler having specific gravity between about 1 and about 1.5.
   (c) between about 20 and 50 wt% based on total formulation of particulate filler of a particle size less than 20 microns; and
   (d) between about 20 and about 60 wt% based on total formulation of particulate filler of a particle size between about 20 and about 200 mesh.

2. A plastic formulation according to claim 1 in which the plasticized normally solid resin comprises vinyl chloride/vinyl acetate copolymer and the organic fibrous filler is present in amounts between about 0.5% and about 10 wt% of the formulation.

3. A plastic formulation according to claim 1 in which between about 20 and about 50 wt% of the formulation consists essentially of calcium carbonate particles of less than 10 microns in size and which contains no more than about 1 wt% particulate filler of a particle size larger than 20 mesh and no more than about 15 wt% particulate filler of a particle size between 20 microns and 200 mesh.

4. A plastic formulation according to claim 1 which includes between about 0.5% and about 2 wt% of a thermoplastic butadiene/acrylonitrile rubber.

5. A plastic formulation according to claim 1 wherein the plasticized normally solid resin comprises less than about 20 wt% of said formulation.

6. A plastic formulation according to claim 1 in which the fibers of the fibrous filler average between about 0.01 inch and about 0.15 inch long.

7. A plastic formulation according to claim 1 in which the fibrous filler consists essentially of polyester fibers or cellulosic fibers.

8. A plastic formulation according to claim 1 in which the normally solid resin comprises chlorinated polyethylene and in which plasticizer is present in amounts between about 15 and about 40 wt% based on resin.

9. A plastic formulation according to claim 8 in which the chlorinated polyethylene contains at least about 30 wt% chlorine and has a molten viscosity between about 10,000 and about 30,000 poises at 190° C.

10. A plastic formulation according to claim 1 in which between about 4% and about 10 wt% based on total formulation of a vinyl chloride/vinyl acetate/ethylene terpolymer resin is also present, said terpolymer resin comprising between about 80 and about 90 wt% vinyl chloride units, from about 7 to about 14 wt% vinyl acetate units and from about 1 to about 3 wt% ethylene units.

11. A plastic formulation according to claim 2 in which said filler of a particle size less than about 20 microns and said filler of particle size between about 20 and about 200 mesh comprises calcium carbonate and the organic fibrous filler is polyester fiber or cellulosic fiber.

12. A plastic formulation according to claim 11 in which the vinyl chloride/vinyl acetate copolymer comprises between about 80 and about 95 wt% vinyl chloride units and between about 5 and about 20 wt% vinyl acetate units and in which plasticizer is present in amounts between about 15 and about 40 wt% based on vinyl chloride/vinyl acetate copolymer.

13. A plastic formulation according to claim 12 in which the fibrous filler is present in amounts between about 1 and about 4 wt% of the formulation, the plasticizer and resin is present in a total amount between about 10 and about 20 wt% of the formulation and the formulation contains no more than about 1 wt% particulate filler of a particle size larger than 20 mesh and no more than about 15 wt% particulate filler of a particle size between 20 microns and 200 mesh.

14. Plastic tile essentially free of asbestos and manufactured from a plastic formulation comprising an intimate mixture of:
   (a) plasticized, normally solid resin selected from the group consisting of vinyl chloride/vinyl $C_2$–$C_4$ alkanoate copolymer, vinylidene chloride/vinyl chloride copolymer, vinyl chloride/propylene copolymer, chlorinated polyethylene and mixtures thereof;
   (b) an organic fibrous filler not easily dispersed in said formulation, said orgaic filler having a specific gravity between about 1 and about 1.5.
   (c) between about 20 and about 50 wt% based on total formulation of particulate filler of a particle size less than about 20 microns; and
   (d) between about 20 and about 60 wt% based on total formulation of particulate filler of a particle size between about 20 and about 200 mesh.

15. Plastic tile according to claim 14 in which the plasticized normally solid resin comprises vinyl chloride/vinyl acetate copolymer and the organic fibrous filler is present in amounts between about 0.5% and about 10 wt% of the formulation.

16. Plastic tile according to claim 15 in which between about 20 and about 50 wt% of the formulation consists essentially of calcium carbonate particles of less than 10 microns in size and contains no more than about 1 wt% particulate filler of a particle size larger than 20 mesh and no more than about 15 wt% particulate filler of a particle size between 20 microns and 200 mesh.

17. Plastic tile according to claim 15 which includes between about 0.5% and about 2 wt% of a thermoplastic butadiene acrylonitrile rubber.

18. Plastic tile according to claim 15 wherein the plasticized normally solid resin comprises less than about 20 wt% of said formulation.

19. Plastic tile according to claim 15 in which the fibers of the fibrous filler average between about 0.01 inch and about 0.15 inch long.

20. Plastic tile according to claim 15 in which the fibrous filler consists essentially of polyester fibers or cellulosic fibers.

21. Plastic tile according to claim 15 in which the normally solid resin comprises chlorinated polyethylene and in which plasticizer is present in amounts between about 15 and about 40 wt% based on resin.

22. Plastic tile according to claim 21 in which the chlorinated polyethylene contains at least about 30 wt% chlorine and has a molten viscosity between about 10,000 and about 30,000 poises at 190° C.

23. Plastic tile according to claim 15 in which between about 4% and about 10 wt% based on total formulation of a vinyl chloride/vinyl acetate/ethylene terpolymer resin is also present, said terpolymer resin comprising between about 80 and about 90 wt% vinyl chloride units, from about 4 to about 14 wt% vinyl acetate units and from about 1 to about 3 wt% ethylene units.

24. Plastic tile according to claim 15 in which said filler of particle size less than 20 microns and said filler of particle size between about 20 and about 200 mesh comprises calcium carbonate and the organic fibrous filler is polyester fiber or cellulosic fiber.

25. Plastic tile according to claim 24 in which the vinyl chloride/vinyl acetate copolymer comprises between about 80 and about 95 wt% vinyl chloride units and between about 5% and about 20 wt% vinyl acetate units and in which plasticizer is present in amounts between about 15 and about 40 wt% based on vinyl chloride/vinyl acetate copolymer.

26. Plastic tile according to claim 25 in which the fibrous filler is present in amounts between about 1 and about 4 wt% of the formulation, the plasticizer and resin is present in a total amount between about 10 and about 20 wt% of the formulation and the formulation contains no more than about 1 wt% particulate filler of a particle size larger than 20 mesh and no more than about 15 wt% particulate filler of a particle size between 20 microns and 200 mesh.

27. A plastic formulation suitable for the manufacture of tile and the like, said formulation being essentially free of asbestos and comprising an intimate mixture of:
(a) plasticized, normally solid resin comprising a mixture of vinyl chloride/vinyl acetate and chlorinated polyethylene;
(b) an organic fibrous filler not easily dispersed in said formulation, said organic filler having a specific gravity between about 1 and about 1.5;
(c) between about 20 and about 50 wt% based on total formulation of particulate filler of a particle size less than about 20 microns; and
(d) between about 20 and about 60 wt% based on total formulation of particulate filler of a particle size between about 20 and about 200 mesh.

28. A plastic formulation according to claim 27 in which the ratio of vinyl chloride/vinyl acetate to chlorinated polyethylene is between about 5 to 1 and about 2 to 1.

29. A plastic formulation according to claim 28 in which the vinyl chloride/vinyl acetate comprises between about 80 and about 95 wt% vinyl chloride units and between about 5 and about 20 wt% vinyl acetate units, and in which the plasticizer is present in amounts between about 15 and about 40 wt% based on the mixture of vinyl chloride/vinyl acetate and chlorinated polyethylene.

30. A plastic formulation according to claim 29 in which the filler of particle size less than about 20 microns and the filler of particle size between about 20 and about 200 mesh comprise calcium carbonate and the organic fibrous filler is polyester fiber or cellulosic fiber.

31. A plastic formulation according to claim 30 in which the organic fibrous filler is present in amounts between about 0.5% and about 10 wt% fo the formulation, and in which the fibers average between about 0.01 inch and about 0.15 inch long.

32. A plastic formulation according to claim 31 in which between about 20 and about 50 wt% of the formulation consists essentially of calcium carbonate particles of less than about 10 microns in size and which contains no more than about 1 wt% particulate filler of a particle size larger than 20 mesh and no more than about 15 wt% particulate filler of a particle size between 20 microns and 200 mesh.

33. A plastic formulation according to claim 32 in which the chlorinated polyethylene contains at least about 30 wt% chlorine and has a molten viscosity between about 10,000 and 30,000 poises at 190° C.

34. A plastic formulation according to claim 33 in which between about 20 and about 50 wt% of the formulation consists essentially of calcium carbonate particles of less than about 10 microns in size, between about 0.5 and about 10 wt% of the formulation consists essentially of polyester or cellulosic fiber averaging between about 0.01 inch and about 0.15 inch long and the formulation is essentially free of asbestos and includes less than about 20% by weight of resin plus plasticizer.

35. A plastic formulation according to claim 34 which includes between about 0.5 and about 2 wt% of a thermoplastic butadiene/acrylonitrile rubber.

36. A plastic formulation according to claim 35 in which the total amount of resin plus plasticizer in the formulation is between about 10% and about 20% by weight of the formulation.

37. Plastic tile essentially free of asbestos and manufactured from a plastic formulation comprising an intimate mixture of:
(a) plasticized, normally solid resin comprising a mixture of vinyl chloride/vinyl acetate and chlorinated polyethylene;
(b) an organic fibrous filler not easily dispersed in said formulation, said organic filler having a specific gravity between about 1 and about 1.5;
(c) between about 20 and about 50 wt% based on total formulation of particulate filler of a particle size less than about 20 microns; and
(d) between about 20 and about 60 wt% based on total formulation of particulate filler of a particle size between about 20 and about 200 mesh.

38. Plastic tile according to claim 37 in which the ratio of vinyl chloride/vinyl acetate to chlorinated polyethylene is between about 5 to 1 and about 2 to 1.

39. Plastic tile according to claim 38 in which the vinyl chloride/vinyl acetate comprises between about 80 and about 95 wt% vinyl chloride units and between about 5 and about 20 wt% vinyl acetate units, and in which the plasticizer is present in amounts between about 15 and about 40 wt% based on the mixture of vinyl chloride/vinyl acetate and chlorinated polyethylene.

40. Plastic tile according to claim 39 in which the filler of a particle size less than about 20 microns and the filler of between about 20 and about 200 mesh size comprise calcium carbonate and the organic fibrous filler is polyester fiber or cellulosic fiber.

41. Plastic tile according to claim 40 in which the organic fibrous filler is present in amounts between about 0.5% and about 10 wt% fo the formulation, and in which the fibers average between about 0.01 inch and about 0.15 inch long.

42. Plastic tile according to claim 41 in which between about 20 and about 50 wt% of the formulation consists essentially of calcium carbonate particles of less than about 10 microns in size and contains no more than about 1 wt% particulate filler of a particle size larger than 20 mesh and no more than about 15 wt% particulate filler of a particle size between 20 microns and 200 mesh.

43. Plastic tile according to claim 42 in which the chlorinated polyethylene contains at least about 30 wt% chlorine and has a molten viscosity between about 10,000 and 30,000 poises at 190° C.

44. Plastic tile according to claim 43, in which between about 20 and about 50 wt% of the formulation consists essentially of calcium carbonate particles of less than about 10 microns in size, between about 0.5 and about 10 wt% of the formulation consists essentially of polyester or cellulosic fiber averaging between about 0.01 inch and about 0.15 inch-long and the formulation being essentially free of asbestos and includes less than about 20% by weight of resin plus plasticizer.

45. A plastic tile according to claim 44 which includes between about 0.5% and about 2 wt% of a thermoplastic butadiene/acrylonitrile rubber.

46. A plastic tile according to claim 45 in which the total amount of resin plus plasticizer in the formulation is between about 10% and about 20% by weight of the formulation.

47. A plastic formulation according to claim 1 wherein the plasticizer, normally solid resin is present in amounts between about 10 and about 30 wt% based on total formulation.

48. A plastic formulation according to claim 7 in which the plasticized normally solid resin is present in amounts between about 10 and about 30 wt% based on total formulation, the organic fibrous filler is present in amounts between about 0.5% and about 10 wt% based on total formulation and the plasticized, normally solid resin comprises vinyl chloride/vinyl acetate copolymer.

49. Plastic tile according to claim 20 wherein the plasticized, normally solid resin is present in amounts between about 10 and about 30 wt% of the tile.

* * * * *